(12) United States Patent
Ploschnitznig

(10) Patent No.: US 8,751,064 B2
(45) Date of Patent: Jun. 10, 2014

(54) METHODS AND SYSTEMS FOR SATELLITE INTEGRATED COMMUNICATIONS

(75) Inventor: John E. Ploschnitznig, McMurray, PA (US)

(73) Assignee: Riverside Research Institute, New York, NY (US)

( * ) Notice: Subject to any disclaimer, the term of this patent is extended or adjusted under 35 U.S.C. 154(b) by 22 days.

(21) Appl. No.: 13/547,425

(22) Filed: Jul. 12, 2012

(65) Prior Publication Data

US 2013/0018529 A1   Jan. 17, 2013

Related U.S. Application Data

(60) Provisional application No. 61/507,279, filed on Jul. 13, 2011.

(51) Int. Cl.
*G05D 1/00* (2006.01)

(52) U.S. Cl.
USPC .............................................................. 701/2

(58) Field of Classification Search
None
See application file for complete search history.

(56) References Cited

U.S. PATENT DOCUMENTS

| 5,952,966 | A | 9/1999 | Smith | |
| 8,358,970 | B2 * | 1/2013 | Judd et al. | 455/11.1 |
| 2005/0285784 | A1 | 12/2005 | Chiang et al. | |
| 2008/0240029 | A1 | 10/2008 | Lynch et al. | |
| 2010/0150129 | A1 * | 6/2010 | Jin et al. | 370/343 |
| 2011/0003608 | A1 * | 1/2011 | Forenza et al. | 455/501 |
| 2012/0040650 | A1 * | 2/2012 | Rosen | 455/414.1 |

FOREIGN PATENT DOCUMENTS

EP   1 168 666 A2   1/2002

OTHER PUBLICATIONS

International Search Report and Written Opinion issued in PCT Application No. PCT/US2012/046508 mailed on Jan. 17, 2013.
International Preliminary Report on Patentability issued in PCT Application No. PCT/US2012/046508 dated Jan. 14, 2014.

* cited by examiner

*Primary Examiner* — Thomas Tarcza
*Assistant Examiner* — Adam Alharbi
(74) *Attorney, Agent, or Firm* — The Marbury Law Group, PLLC

(57) ABSTRACT

Systems and methods for integrate satellite communications. A network of upward facing antennas placed on top of cell phone towers is established. Each upward facing antenna has a footprint at the altitude of a particular satellite orbit. Upward facing antennas are placed on cell towers so as to establish a continuous coverage over the orbit of a satellite(s) thereby allowing continuous communication using cellular technology with the satellite(s) on orbit.

29 Claims, 8 Drawing Sheets

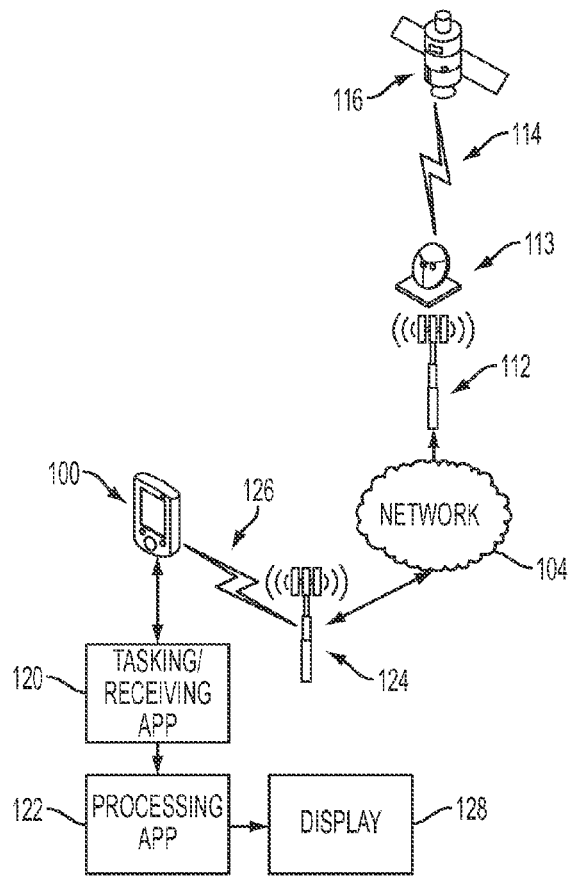
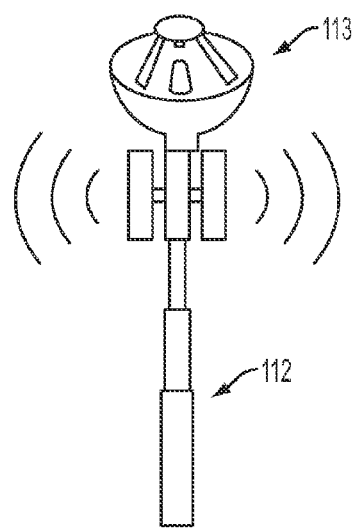

METHODS AND SYSTEMS FOR SATELLITE INTEGRATED COMMUNICATIONS

CROSS-REFERENCE TO RELATED APPLICATIONS

This application claims the benefit of U.S. Provisional Patent Application No. 61/507,279, entitled "INTEGRATED COMMUNICATION ENVIRONMENT FOR SATELLITES," filed Jul. 13, 2011, the entire contents of which is incorporated herein by reference.

FIELD OF THE INVENTION

This invention related generally to satellite systems and methods of communication.

BACKGROUND

Traditionally satellite communications are conducted using a relatively small group of dedicated ground stations using dish antennas which physically moved in azimuth and elevation to track satellites as they passed over head. This infrastructure is expensive to build, maintain, and operate, and is inherently limited in the total number of daily accesses, because the antenna is only capable of communicating with one satellite at a time. Consequently, communication with multiple satellites at the same time is impossible. This will become more evident as hundreds to thousands of SMALLSATS, NANOSATS, and PICOSATS are launched into space over the next decade. In addition to physically handling many satellites simultaneously, the electronic infrastructure must also be upgraded to handle simultaneous communication to ensure uplink of vital mission instructions and the downlink of valuable data.

SUMMARY

Generally, embodiments illustrated herein concern a satellite communication system having a plurality of upwardly pointing antennas each configured to communicate with a non-geostationary satellite traveling along an orbital path. These antennas, together with their respective towers and other communications capabilities, are sometimes referred to herein as communications station(s). The upward pointing antennas are each configured to transmit a signal upwardly to a passing satellite, the signal pattern expanding in diameter as the distance from the antenna increases, thus forming an orbital intercept area along the orbital path of the non-geostationary satellite.

The non-geostationary satellite(s) is adapted to receive the signal when traversing the orbital intercept area created by the communications stations and antennae. The plurality of upwardly pointing antennas form a series of partially overlapping orbital intercept areas, the series of partially overlapping orbital intercept areas covering a continuous extent of a substantial portion of the orbital path. Thus, signals can be uploaded and data downloaded over an extended portion of an orbital path as tasked by a user.

The satellite communication stations system and their upwardly pointing antennas are secured to respective communication stations and associated towers or other structure such as, but without limitation, buildings, cell towers, purpose-built towers and structures, and are operatively connected to a communication network, such as a cell phone network, wireless network, wired network, or other type(s) of communication networks.

The satellite communications stations of the various embodiments have other antennas, each secured to respective individual communication stations, the plurality of additional (or second) antennas each aimed at a horizon, or largely horizontally aimed and are configured to communicate with at least one other of the plurality of communication stations. These second antennas may be a cellular antenna although this is not meant as a limitation.

The beam width of the signal is defined by a diameter of the orbital intercept area through which the non-geostationary satellite is configured to pass. The beam width of the upwardly pointing antennae may be narrower than a satellite antenna beam width (for down linking data) While in an embodiment, the diameter of the beam width is substantially the same for the plurality of upwardly pointing antennas; this is not meant as a limitation. The distance between the adjacent communication stations will dictate the beam width at the orbital altitude of the satellite of interest.

The satellite communication system further has a number of user devices, each having processing capability and adapted to store a satellite tasking application. The user device(s) is adapted to store software instructions that cause a processor that is within the user device to communicate with the non-geostationary satellite using the satellite tasking application stored in memory of the user device for communicating over the communication network.

The satellite tasking application on a user device is adapted to prompt a user of the user device with one or more menus configured to assist the user in developing a task to be communicated to the non-geostationary satellite. In this way, the user input for tasking the satellite tasking is communicated to the non-geostationary satellite. This communication may occur over a cellular network to the antennas communicating with a satellite as it passes through its orbit in a specific area or region.

The user device is also adapted to receive satellite data, reformat the satellite data into a format chosen by the user, and display the reformatted satellite data on the user device. Again the application stored on the user device allows the on board processor of the user device to perform these functions. The user device may be a mobile device using wireless communications, such as a cell phone, a PDA, a laptop computer, or it may be a desktop computer as well. These user devices noted are not meant as a limitation.

The satellite communication system may also have a satellite tasking server being operatively connected to the communication network. The satellite tasking server stores a first set of tasking commands used in tasking any number of non-geostationary satellites. The satellite tasking server is adapted to be accessed by the user device by way of the communication network for communicating with the non-geostationary satellite using the tasking commands. The satellite tasking server maintains a library of tasking commands uniquely suited for tasking of non-geostationary satellites that may be of interest to a user. The tasking server interactively communicates with the user device so that a user can input the desired characteristics of image(s) or other data derived from the satellites being tasked (i.e. time of day, type of data, format duration of data feed, and other desired characteristics of the capabilities of the satellites). In this way, the user can query for satellite data, and the tasking server can then assign the tasking query to the first available satellite that meets the characteristics of the user's query. Alternatively, the user may desire data from a specific satellite, in which case, the tasking server formats the request for data in a task request for the specific satellite that is desired by the user. This alleviates the need for the user to be conversant in all aspects of satellite tasking. The tasking server applies appropriate tasking rules based on the satellite desired, orbital characteristics of satellites, the type of data requested, and other factors associated with satellite data collection.

Further, the satellite tasking server maintains a list of satellites that may be tasked. The non-geostationary satellite, being selected by a processor, is then based at least in-part on an ability of the non-geostationary satellite to obtain requested data as tasked from a user device.

In the various embodiments illustrated herein, both the satellites and the user devices and tasking servers (if used) leverage the various cellular and smart phone software that now exists, or that may exist in the future, for communication on the network and with the orbiting satellites. Such smart phone technology (android and other) is well advanced, and can easily fit the needs of tasking and execution of that tasking, by a satellite. Thus, the various embodiments may also include a smart phone communication capability (or card) on the satellite to maximize use of such technology. The satellites are simply equipped with a more powerful transmission antenna on the satellite so that commands can be received and data can be down linked to the cell towers (and the upwardly pointing antennae) based upon smart phone commands. Use of this technology also allows more applications to be written for such satellites by those who are not necessarily satellite engineers.

Various embodiments illustrated herein provide a continuous network of satellite communication towers that create a geographically broad and instantaneous capability of communicating with a variety of satellites in low Earth orbit without the need for traditional ground stations. The system and its embodiments illustrated herein comprise retrofitting commercial cellular towers located at advantageous geographic intervals with a high gain upward-looking antenna, such that the projected footprint of the plurality of these antennas at the altitude at which satellites orbit provide continuous geographic coverage over a wide area in which the satellites travel in their respective orbits.

Because the advantageously selected individual cellular towers will provide an area of continuous satellite communication coverage, there is no need for individual ground stations with movable antennas since, at any given time, multiple antennas will have an opportunity to communicate with a satellite in low Earth orbit. An additional advantage of the embodiments illustrated herein is that real-time information can be obtained from satellites and communicated to various computing devices of users. This, in turn, increases the utility of satellites since the various embodiments illustrated herein drives down the costs of acquisition of data from the satellites in these low Earth orbits. This makes possible a wide variety of new applications and consumers for the satellite data.

In various embodiments, the existing Cellular Towers are modified to provide a fixed narrow beam upward pointing antenna. Individually, one cell tower would provide limited communication access; but, distributing these antennas over appropriately spaced cell towers provides overlapping coverage spanning large areas of any size. In this fashion, satellite communications is integrated into the existing cellular networks thereby avoiding the prior dedicated ground station concept, while offering a new Integrated Communication Environment (ICE) for all future satellite programs.

By adapting the existing cellular communication towers to include upward pointing fixed beam antennas, costly dedicated ground stations can be eliminated. The existing towers, which are already positioned to provide overlapping coverage spanning large areas on the surface of the Earth, would likewise provide large area coverage of the sky above, although a different type of antenna must be used in the various embodiments noted herein. Such a capability does NOT exist on such towers and represents an entirely new functionality for such cell towers. Every cell tower offers as connection to an existing cellular communication network. The new satellite communication environment illustrated herein leverages these potential networks as an established communication highway, which will carry uplink data to the appropriate cell tower antenna, and downlink data from the cell tower antenna. In the various embodiments, satellites are equipped with communication software that leverages existing smartphone technology to allow integration with the existing cell networks. Because the entire system is based on cellular technology and uses the existing cellular network, management of satellites is accomplished using specially equipped smartphones, or via specially designed "Smartphone" communication boards for SMALLSATS, NANOSATS, and PICOSATS (collectively "Satellites" for purposes of this application).

In the various embodiments, a satellite communication and control network is established using the existing ground-based cellular communications systems and infrastructure. Dedicated upward pointing antennas on selected existing cell towers provide necessary coverage of areas of the sky over which satellite pass while on orbit. The cellular network simultaneously sends and receives commands and other data to and from multiple satellites within range of the tower. As satellites move between the coverage areas of each tower along an orbital path, communication is automatically passed from one tower to the next in the same way that a cellular telephone signal is automatically passed from tower to tower when driving on the road. Thus, the various embodiments illustrated herein establish a virtual satellite monitoring system to automatically pass a signal from tower to tower, based on the known orbital tracks of the various satellites, thereby creating a seamless communication stream from the satellites to the ground network. This continuity of communication allows reliable live streaming video and audio transmission from the satellite directly to the user(s).

Many of today's SMALLSAT and NANOSAT satellite systems are using Smartphone technology based on size, sophistication, and capabilities. Various embodiments illustrated herein use existing broadband networks (GSM, 3G, 4G, etc) to transmit and receive data packets and potentially live streaming data. Streaming video may be realized from a constellation of swarming satellites in low earth orbit, monitoring storms, natural catastrophes, etc. Smartphone technology may be used for communication technology of the various embodiments illustrated herein. The benefit of using this technology is even further enhanced when considering the inherent communications capability offered by smartphones. In an embodiment, the satellite-based system involves increased transmit power merged with a downward pointing high-gain antenna for communication with the upward pointing high gain antennas that are installed on various cell phone towers comprising the network.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 2 illustrates an alternate embodiment of an architecture that utilizes the communication system is illustrated.

FIG. 3 illustrates an antenna placement associated with the various embodiments.

DETAILED DESCRIPTION

Figure 1:
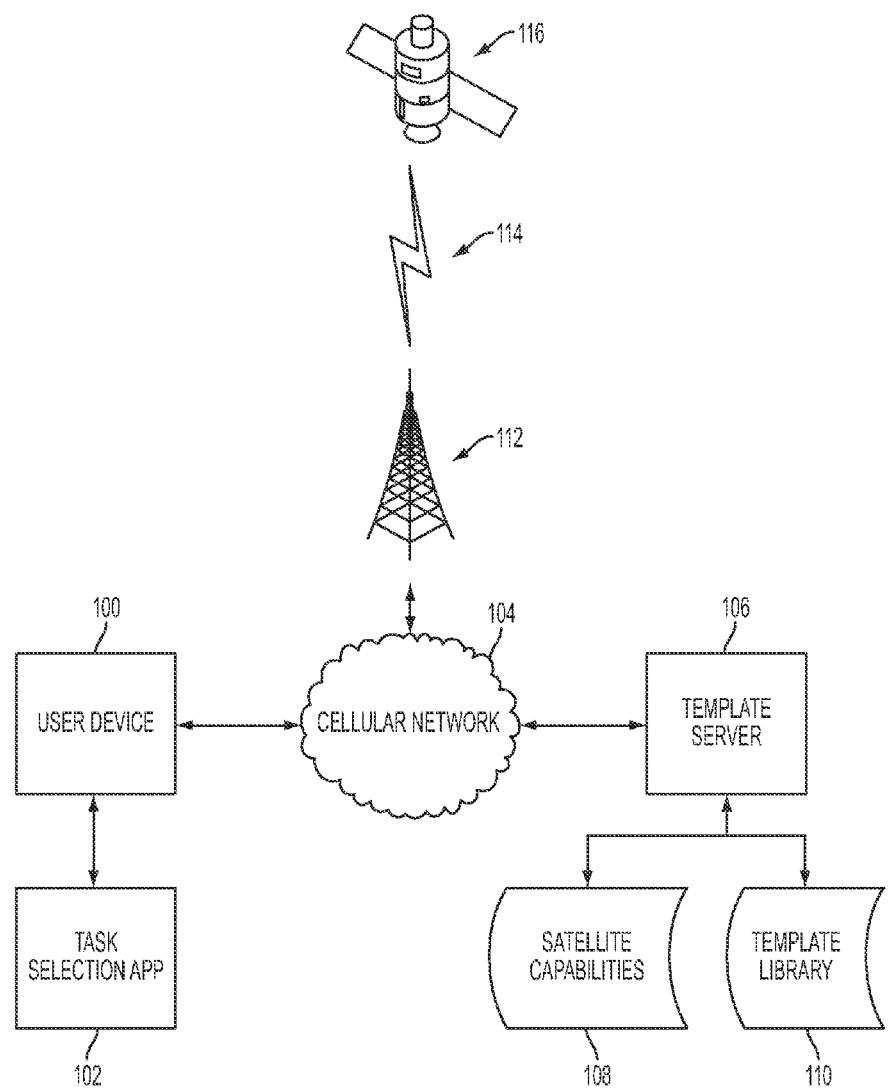
FIG. 1 is a communication system block diagram of an embodiment system.

The various embodiments will be described in detail with reference to the accompanying drawings. Wherever possible, the same reference numbers will be used throughout the drawings to refer to the same, or like, parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "cellular" and "cell" refer to a variety of wireless telephone systems, networks and supporting infrastructure, such as towers, that may be configured to operate with a variety of technologies, such as GSM, CDMA and AMPS.

Current Cellular towers are dedicated to providing the necessary coverage for terrestrial communication through antennas aimed at the horizon. Embodiments illustrated herein integrate a high gain antenna pointing upward, on existing cell towers. Based on the network and chosen transmit/receive frequency, an antenna configuration can provide the necessary orbital footprint at Low Earth Orbit, approximately 400 km. For instance, a 4G network operating at 4 GHz will require a minimum 25 cm dish to create a 20 degree footprint in space. This footprint will require a high gain antenna on a cell tower every 100 km. The dish size would likely be increased in order to minimize spill over (low power back lobe for human safety) and avoid high power interference to the other terrestrial antennas.

Using this approach, a network of a plurality of cell towers, appropriately spaced, in order to provide overlapping orbital coverage at Low Earth Orbit (LEO) satellite altitudes provides the necessary coverage. Only a fraction of the many available cell towers are required to provide continual communication over large areas of land. The various embodiments enable providing communication with orbiting satellites in low earth orbit, using components found in current smart phones installed on satellites, and communicating over the existing cellular telephone network and existing cell towers equipped with specialized high gain antennas pointing vertically upwards. This top mounting position minimizes potential interference from other antennas on the tower. As satellites pass through the beam produced from each antenna, communications signals will be transmitted between the satellite and the antenna using the cellular network protocols.

The number and location of cell towers equipped with specialized antennas depends on the gain and beam width of each antenna. The lower the gain and wider the beam, the fewer towers which are needed to provide complete coverage of the sky. Likewise, the signal footprint of each satellite must be sufficiently wide to support simultaneous coverage over neighboring cell towers to ensure uninterrupted communication. Thus, the infrastructure necessary to provide continuous communication with orbiting satellites is distributed over many smaller antenna sites, as opposed to a smaller number of large ground stations using much larger antennas which tracks a single satellite across the sky.

In an embodiment, satellites are equipped with long aerials which permit satellite-to-satellite communications. This configuration is used to permit satellites to relay signals through other satellites and then to cell towers on the ground when the original satellite is over large bodies of water where direct communication with cell towers is not possible.

In an embodiment, existing optical capabilities of current cell phones could be coupled with telescopes on board satellites to provide live imaging, which could be streamed over the cell network to any desktop or handheld application residing on a user device.

All communications with a satellite take place over the existing cellular network. In an embodiment, a satellite monitoring system and appropriate software send data to and from the satellite in logically small transfer packages. Transfer packages are designed to identify standardized data types, for example, Command and Control (C2) uplink, Status of Health (SoH) downlink, and data packages for transfer.

Software monitors SoH, manages requirements, performs tasking, creates satellite commands and manages satellite operations. Software is also responsible for managing the overall communication network, for example coordinating the transfer of a signal from one tower to the next as the satellite passes overhead, and organizes data packages for transmission.

Software is designed to monitor SoH, to manage requirements, to perform tasking, to create satellite commands and manage satellite operations, to operate the network (under certain operational demands such as Multiple-Cell Tower Operations), and manage the data packages for aggregating into larger data packages that are logically associated with one another.

The existing cellular telecommunication infrastructure is utilized in order to integrate the various embodiments illustrated herein and to potentially minimize typical cellular communication operational overhead. For example, the fact that a particular satellite trajectory will be known allows configuration of the appropriate sequential cell towers to act as one continual connection and provide seamless video transmission from an appropriately equipped satellite.

Referring now to FIG. 1, a generalized concept of and architecture for user interaction with a cell tower-based satellite communication embodiment is illustrated. In the various embodiments illustrated that follow, a user device 100 which may be, for example, but without limitation, a cell phone, a PDA, a tablet computer, a laptop, a desktop, or any other user device, stores a satellite tasking application 102. A satellite tasking application 102 walks the user through a series of menus that assist the user in developing a task to be communicated to a satellite. For example, the tasking at location 102 may ask the user if an image is desired for weather purposes, for agricultural purposes, for a simple snapshot of a portion of the earth, etc.

The user 100 makes a selection from the satellite tasking application 102 and communicates that selection over a network 104. In this illustration, the communication medium is a cellular network, however, this is not meant as a limitation. Other devices may communicate directly over the Internet, or other networks, and these networks are considered to be within the scope of the various embodiments illustrated herein. The user selection is communicated to a template server 106. The purpose of the template server is to take the tasking request of the user and determine what satellite capabilities are necessary to satisfy that tasking request. The template server searches an inventory of satellites to determine the satellite capability from the database 108 that best exemplifies the type of satellite that is required to satisfy the user request. Once the satellite is selected, a template is retrieved from a template library 110 that comprises instructions that are specific to the satellite that is desired. Since different satellites will have different characteristics and different tasking commands, an appropriate template from the template library 110 is retrieved in order to facilitate satellite tasking.

Once the template from the template library is retrieved, the template server 106 communicates the commands to a cell tower 112 via a network 104. Again in this high-level illustration, a cellular network is illustrated, although this is not meant as a limitation. The antenna on the cellular tower 112 then communicates the commands necessary to satisfy the users tasking to the appropriate satellite 116. Satellite 116 collects the data, communicates at 114 to a cell tower 112 that is within the appropriate path of satellite 116 and communicates that information over the network 104 to user device 100. Because there are multiple Towers 112 in the path of satellite 116, the tasking and collection commands and data may be uploaded via one tower and downloaded via a different tower.

Referring now to FIG. 2, an alternate embodiment of an architecture that utilizes the communication system is illustrated. In this embodiment, user device 100 further comprises a memory having a tasking and receiving application 120 stored therein. The memory of the user device further comprises a processing application 122 which takes the received information from a satellite and renders it in a form desired by the user, for example, but without limitation, a photograph, a saved file, navigational information.

User device may be a normal cell phone having appropriate processing capability, or a special-purpose user device having enhanced capabilities specific to satellite communication. In either case, user device 100 interacts/communicates 126 with its nearest cell phone tower 124 to send instructions over network 104 via a cellular tower 112 having an upward looking antenna 113 that is on the orbital track of satellite 116. Once the user sends tasking from the tasking 120, it is uplinked 114 to satellite 116 for execution.

Once the satellite is in a position to obtain the requested data, satellite 116 obtains the requested data and downlinks 114 information to the upward facing antenna 113 present on cell tower 112. That data is then sent or streamed, as the case may be, over network 104 to the cell tower nearest the user 124 which then transmits the information 126 via normal cellular communication to user device 100. The information is then processed via processing application 122 and is displayed for the user 128 on any internal or external display as desired.

FIG. 3 is an illustration of an embodiment showing an upwardly pointing antenna fitted to an existing cellular tower.

As can be seen from this FIG. 3, a small high gain antenna 113 is mounted on top of a conventional cellular tower 112. This antenna is pointed upward to establish an appropriate footprint at the altitude at which low earth orbit satellites are placed.

Figure 4:
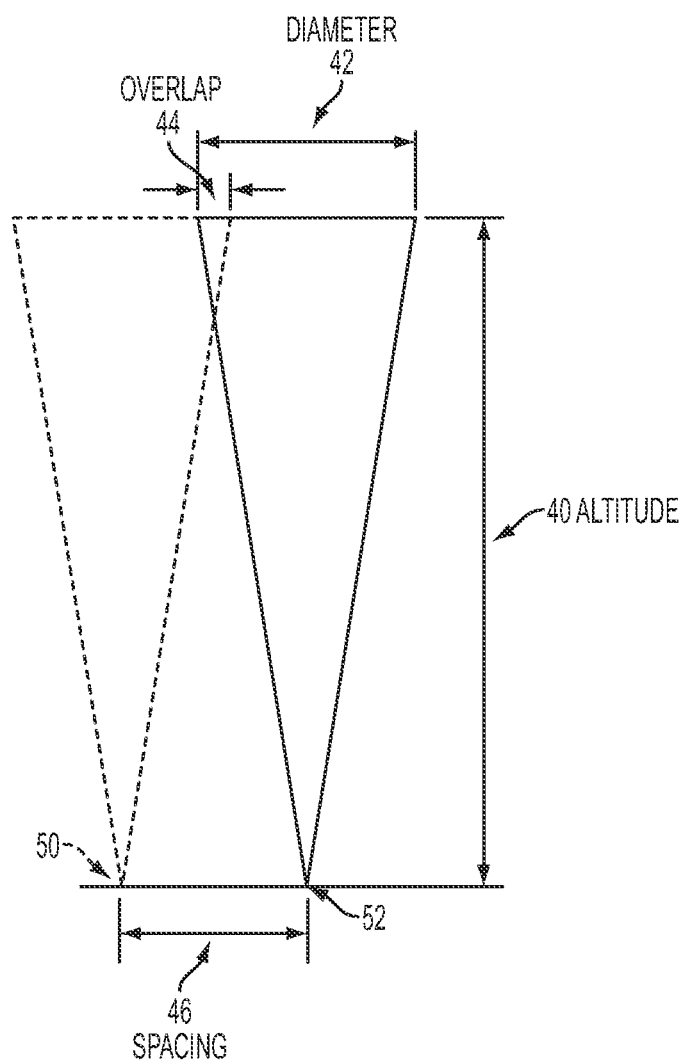
FIG. 4 illustrates the establishment to cell tower antenna patterns.

Referring now to FIG. 4, the establishment to cell tower antenna patterns is illustrated. In various embodiments, the cell tower antenna pattern establishes the needed coverage. The antenna is mounted rigidly on top of the cell tower, pointing upward as noted above. This minimizes interference with the many other antennas surrounding the cell tower.

The antenna beam width 42 defines the orbital intercept area in space and the diameter of the intercept area based on the altitude 40. It also defines the maximum distance between antenna installations 46. In this figure, cell tower locations are noted as 50 and 52. These physical settings establish the satellite operating environment (access time per cell), which impact communication operations. Based upon the location of cell towers, for example 50 and 52, and the predicted altitude of the satellite 40, antenna beam width can be designed so that there is always an overlap 44 of the projected beamwidth at the appropriate altitude. In this fashion, the satellite is always in communication with at least one cell tower and potentially two cell towers in order to facilitate consistency of communication.

The community desire will be to minimize the number of cell tower antennas necessary to perform the mission. This is accomplished by utilizing existing cell towers, and designing beam widths with the knowledge of the orbital altitude of the satellite(s) of interest. With knowledge of the specific location of existing cell towers, variable beamwidth antennas may be designed for each cell tower to accomplish the continual coverage of the various embodiments illustrated herein. Further, using existing cell towers as a baseline for the network of the various embodiments minimizes new hardware installation cost.

In an embodiment, the satellite communication antenna must be designed to support simultaneous coverage over neighboring cell towers to ensure uninterrupted communication. A Link Budget Analysis is used to define the minimum equipment requirements in order to ensure a robust communication capability.

Figure 5:
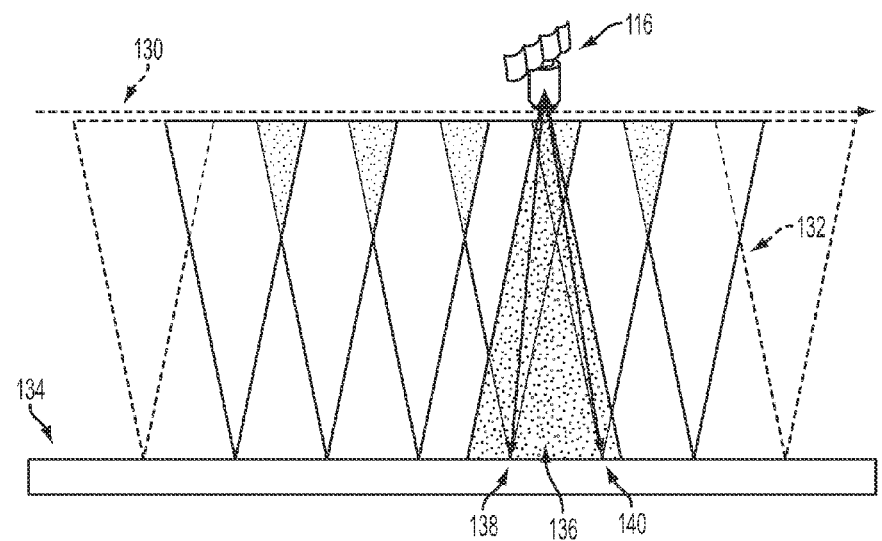
FIG. 5 illustrates a satellite communication antenna providing simultaneous communication with neighboring cell towers.

Referring now to FIG. 5, a network of cell tower installations is illustrated. FIG. 5 is an illustration of a satellite communication antenna providing simultaneous communication with neighboring cell towers.

As illustrated in this FIG. 5, a satellite 116 is in an Earth orbit 130 over the surface of the Earth 134. In an embodiment, satellite communication may, in fact, be received by more than one cell tower 138, 140 at a time therefore increasing redundancy and reliability of the receipt of a signal. The minimum satellite antenna beam width 136 must be greater than the cell tower antenna beam width 132 in order to maximize communication link duration performance.

In alternative embodiments, satellites may be equipped with a variety of sensors, such as visual cameras, infrared sensors, and multispectral sensors. This list is merely for illustration and is not intended as a limitation. Any sort of sensor(s), which can be physically attached to the satellite, would be available, and data from these sensors would be passed over the cellular network to end users.

Figure 6A:
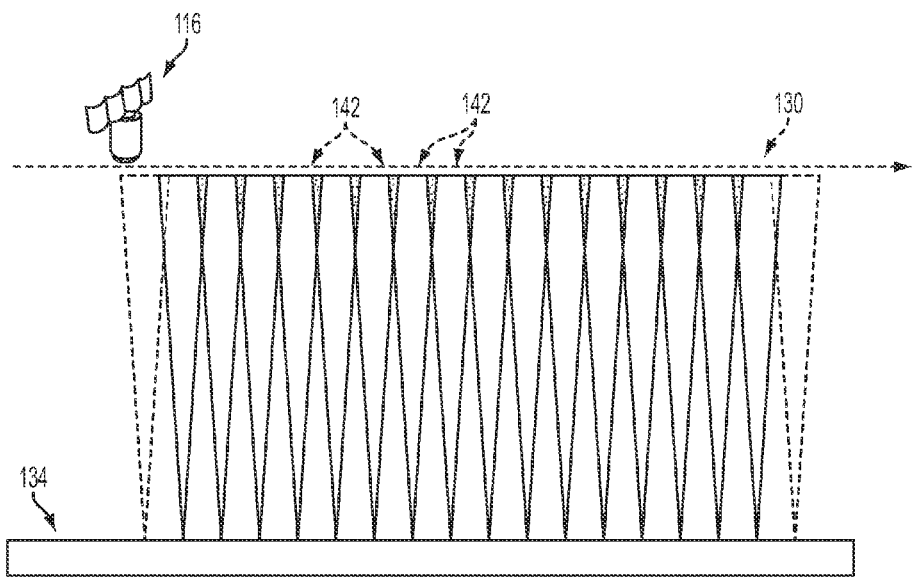
FIGS. 6A and 6B illustrate the relative density of equipped towers based on the antenna beam width and the antenna spacing.
Figure 6B:
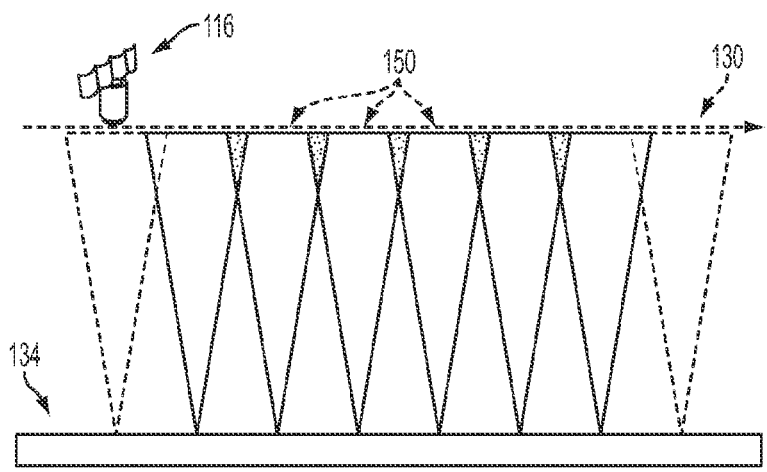

FIGS. 6a and 6b illustrate the relative density of equipped towers based on the antenna beam width and the antenna spacing. FIG. 6A illustrates satellite 116 proceeding, on orbit 130 over the surface of the Earth 134. Individual upward pointing antenna that are close to one another have beam widths 142, which would overlap with one another at the altitude of orbit 130. In this fashion, satellite 116 is always within the receiving field of at least one upwardly pointing antenna, and each antenna beam width 142 is relatively narrow.

Referring now to FIG. 6B, a varying antenna width of an embodiment is illustrated. In this instance, satellite 116 is proceeding on orbit 130. This orbit is represented as the same altitude as the orbit in FIG. 6A.

In this instance, however, because the cell towers are spaced, or exist, at greater intervals, the antenna beam width 150 is engineered to be wider than the antenna beam width 142 (FIG. 6A). Thus, in various embodiments, and depending upon the location of various cell towers and their distance from one another, antenna beam widths can be easily varied to cover the entire orbit of a satellite.

The cell system operational frequency and potential output power will dictate the antenna beam width, which will constrain the maximum antenna ground spacing/location necessary to maintain uninterrupted coverage.

Figure 7:
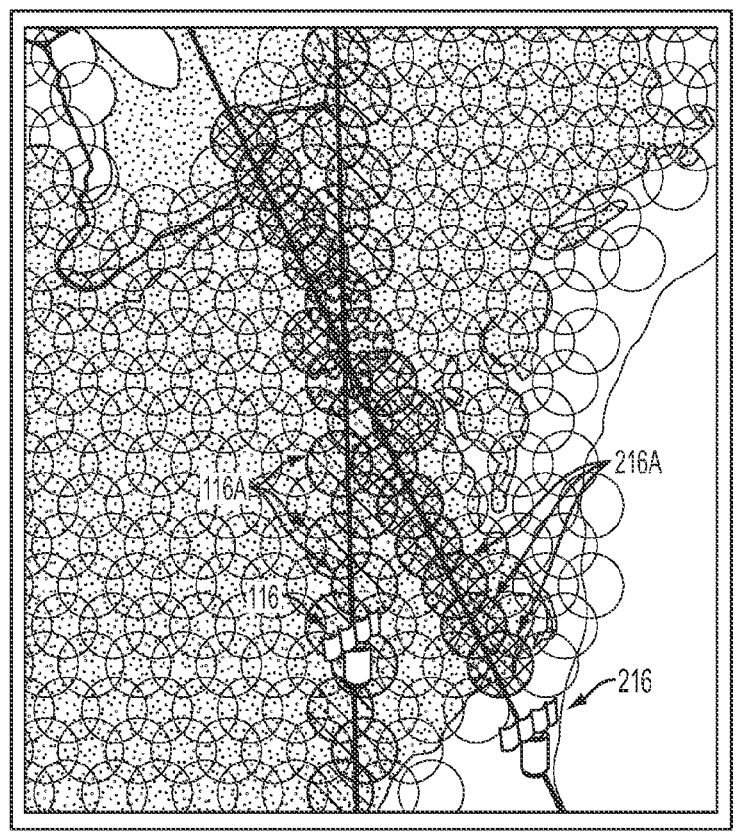
FIG. 7 illustrates cell tower configuration for satellites in different orbits.

Referring to FIG. 7, a cell tower configuration for satellites is illustrated. When specific data is desired from a given satellite, the trajectory of the satellite can be predicted. For purposes of this figure, the orbits of satellites 116 and 216 are illustrated superimposed over an image of the surface of the Earth. The various circles 116A illustrate antennae footprints at the altitude of satellite 116 in the path of its orbit. Similarly, the colored circles 216A represent the antenna footprint at the altitude of satellite 216.

As can be seen from the intersection of each orbit over the circles representing the antenna footprint at the satellite orbital altitude, it is possible to configure a network of cell towers along any particular orbital path to receive a constant stream of data from a particular satellite passing over those cell towers. It should also be noted that in certain instances the same cell towers may in fact be configured to receive data from both satellites at different, or at the same times.

Based upon the various embodiments illustrated herein, there are a number of applications for this technology. Various use cases are noted below, but should not be determined to be limiting, rather they are merely a number of examples of how a communications network of the various embodiments may be utilized.

Global EO/IR Constellations to Support:

Weather Tracking.

The various embodiments illustrated herein allow for rapid weather tracking. In an active weather scenario, it is critical for emergency responders to receive weather information in near real-time. The ability to receive information from satellites for people who are possibly immediately affected by developing weather is enhanced by the ability to use cellular communication technology to communicate with cellular towers to send instructions and receive data from orbiting satellites in near real-time.

Volcanic Activity Ash Cloud Tracking.

Volcanic activity has proven to be a very real hazard to aviation, the environment, and individual health. The ability to actively track an ash cloud, and thereby make predictions concerning the impact on aviation, the environment, and human health, is enhanced by the various embodiments illustrated herein. Once again, communication with imaging satellites of all types could be accomplished via cell tower communication with events being reported in near real-time to civil authorities, as well as aviation authorities, thereby being able to redirect traffic and potential evacuation paths for civilians in a more effective manner.

Global Multi-Spectral/Hyper-Spectral (MSI/HSI) Constellations to Support Emergency Management (Pre Baseline Measurements Comparison to Post Event Measurements).

Multi-Spectral and Hyper-Spectral satellites provide valuable information in specific spectral bands for analysis of a variety of phenomena. Additionally, different chemicals and substances absorb and reflect energy from the sun in different fashions and in different quantities in different spectral bands. Having immediate access to MSI and HSI satellites via the ICE Network allows for near real-time uploading of specific spectral templates necessary to detect desired component/ material in question (for example, oil leak). This is in contrast to current operations where one must request such satellite tasking well in advance of a particular need. Further, tasking must go through a ground station, which must test the satellite, acquire the data, format it, and then ultimately provide it to the user. Systems and methods associated with the embodiments illustrated herein allow such tasking to be accomplished via an application on a cell phone so that the user may task the satellite and receive the data directly to a user's cell phone or other cellular instrument.

Pre-Planned Spectral Templates.

Communication capabilities of the various embodiments illustrated herein also allow for Pre-Planned Spectral Templates/Profiles to confirm presence of suspect material/ chemicals. Such templates can be directly associated with the recording of desired phenomena. For example, tasking templates can be developed for a variety of specific tasks, such as analysis of specific chemical spills, evaluation of crop health, detection of nuclear leaks, contamination of wastewater by suspected chemicals, tracking hurricane damage, and a variety of other tasks. These preplanned templates can be uploaded by a user based upon a selection from a template library which may be centrally located. In such an instance, a user that would be a subscriber to such a service, would access a server, select the template of interest, and direct the template to be uploaded to the next satellite having the capability to perform the desired task at the location desired by the user. All of this could be done from a cell phone application thereby eliminating the need for proceeding through a variety of levels of administration to a ground station for tasking of the satellite. For example, an infrared satellite could be used to track heat patterns in an urban area. The multispectral satellite could be used to assess particular crops in particular spectral bands thereby assessing crop health. Similarly, other areas and applications may have their own specific templates which could be uploaded as needed by the user using the communication system illustrated herein. An equally important use would be for news organizations to receive near real-time data from tasking satellites as stories develop. This would lead to a more informed populace by virtue of access to image-related information.

Advertisement Opportunities.

Opportunities exist for monetizing satellite communication capabilities with the embodiments illustrated herein. For example, just as advertising and "augmented reality" now exist in the gaming world, this opportunity would also exist for satellites communication and information that is received by users. For example, Google may launch a constellation of imaging satellites that will paint their free globe (Google Earth) with near real-time low resolution imagery, then it could offer advertisement space on the image (such as a translucent water mark), or a commercial pop up on the window as the user zooms into the individual images. This advertising space could be linked to messages associated with the particular tower that is being used for communication. In this fashion, advertising can be keyed to the specific area in which users are receiving information from a particular satellite.

By virtue of the fact that the cellular towers of the various embodiments illustrated herein create an uninterrupted communication link for thousands of miles, a user can stream digital data from an imaging satellite to a cell phone as the satellite transits along its orbital path. In this fashion, users can effectively see what the satellite sees in near real-time as that satellite passes over any particular geographic area that has cellular tower coverage.

Advance Technology and Support for Research.

The U.S. government, or perhaps private industry, may launch approximately 120 satellites into a Walker Constellation. While a Walker constellation only covers geographic areas below a certain latitude, a Walker constellation can provide a higher diversity of areas covered then can a polar constellation. Since an increase in the diversity of coverage translates into a larger number of satellites simultaneously viewing a user on the ground, a high diversity Walker constellation will provide greater availability and therefore redundant data from varying angles that will, in turn, allow enhanced scientific research. Utilizing a communication network of the type illustrated herein will allow multiple individual entities (universities, high schools, companies, groups, nations, individuals) to interact with satellites for a predefined period of time, and in some instances simultaneously. This will foster creative applications of technology. Since such satellites will be fitted with various sensors (EO, IR, RF, Multi Spectral, Hyper Spectral, . . . ), the opportunities for research of all different kinds is dramatically enhanced since data can be accessed in near real-time data at a greatly reduced cost.

Space Situational Awareness (SSA):

This will consist of a specially built space constellation of optical/IR sensors. These sensors can be designed to point in 4 (relative to nadir) side-quadrants. Absolute pointing is not critical given the accuracy of the GPS location of the satellite and utilizing the very well known star maps observed through the wide field of view sensors. Images will be tagged with all the pertinent metadata to support SSA data processing, which will compare sequential images to initially identify moving space objects. Multi satellite simultaneous images will then be processed to accurately triangulate SSA data. ICE becomes the critical communication infrastructure to quickly (near real time), and routinely, send down 4 quadrant space images from hundreds of satellites continually.

Space Object Tracking:

The ICE Dish will be used as a zenith pointing transmission source. The transmitter will interleave special waveforms to easily support Doppler analysis. A special satellite constellation can be used to receive the Doppler-Shifted anticipated/pre-planned waveforms. This data can then be post processed from simultaneous Multi-Satellite observations from a single scatting space object. Not only can the object be located in space, but with enough observations, a state vector can be generated (utilizing the Dr Fred Earl Triangulation Algorithm).

Global Reach (Space Repeaters):

29% of the Earth is covered with land. ICE Dishes could conceivably be floated on buoys, but we lose connectivity to the ground Internet infrastructure. In order to extend beyond land and over water, satellites could be outfitted with very long aerials (zenith or nadir pointing). These could also act as gravity gradient booms. The aerial/boom will act as a side pointing antenna with high orthogonal gain, supporting satellite-to-satellite space communication. A constellation of these satellites would convert and send the typical cellular transmission into the repeater for space message transmission. This signal would be sent from satellite to available satellite. The first satellite to receive the signal, when over land, can then send the message to the desired recipient through the normal ICE Architecture.

Applying the various embodiments illustrated herein, any satellite vendor can purchase a satellite-enabled phone that can be integrated into satellite hardware. In order to reduce weight, these phones would offer no video interface or antenna. These phone circuit cards could then be easily integrated into the NANOSAT or SMALLSAT chassis. Likewise, a monthly service fee or data-package would be charged. Initially, a usage fee may apply. In this fashion, handheld devices to request collection tasking and view products.

Figure 8:
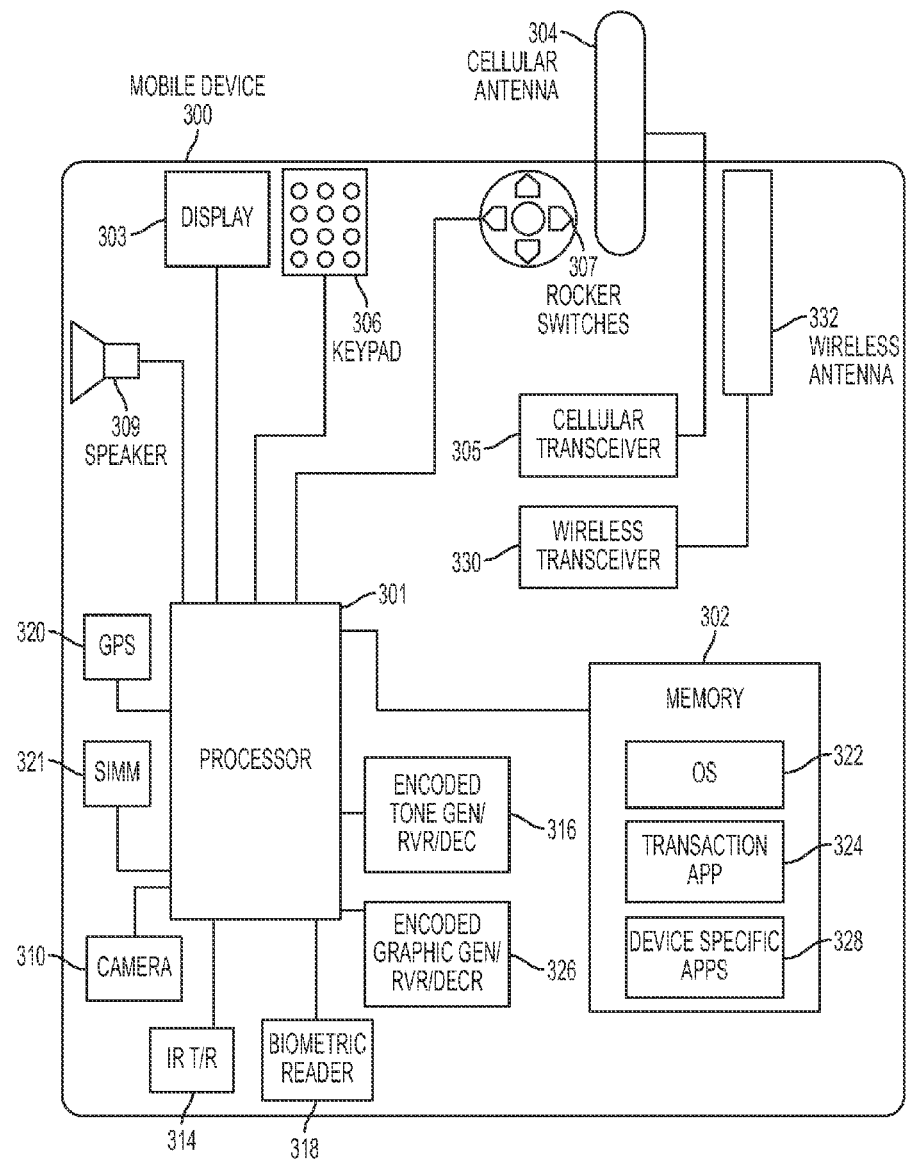
FIG. 8 illustrates a perspective view of a computing device suitable for use as a wireless communication device in various aspects.

A mobile device suitable for use with the various embodiments is illustrated in FIG. 8.

A mobile device 300 may include a processor 301 coupled to an internal memory 302, to a display 303 and to a SIMM 321 or similar removable memory unit. Additionally, the mobile device 300 may optionally have a cellular antenna 304 for sending and receiving electromagnetic radiation that is connected to a cellular transceiver 305 coupled to the processor 301. In some implementations, the transceiver 305 and portions of the processor 301 and memory 302 may be used for multi-network communications. The mobile device 300 may also include a keypad 306, or miniature keyboard, and menu selection buttons, or rocker switches 307, for receiving user inputs. The mobile device 300 may also include a GPS navigation device 320 coupled to the processor and used to determine the location coordinates of the mobile device 300. Additionally, the display 303 may be a touch-sensitive device that may be configured to receive user inputs.

The mobile device 300 may also include a camera 310, an infrared transmitter receiver 314, an encoded tone generator/receiver/decoder 316, a biometric reader 318, and an encoded graphic generator/receiver/decoder 326. These elements may be used to perform various functions assigned to the purchaser mobile device 202 and the merchant mobile device 222 as described above.

A wireless transceiver 330 may provide wireless communications via a wireless antenna 332. By way of illustration and not by way of limitation, the wireless transceiver 330 may be compliant with 802.11x standards.

The processor 301 may be any programmable microprocessor, microcomputer, or multiple processor chip, or chips that can be configured by software instructions (applications) to perform a variety of functions, including the functions of the various embodiments described herein. In an embodiment, the mobile device 300 may include multiple processors 301, such as one processor dedicated to cellular and/or wireless communication functions and one processor dedicated to running other applications.

Typically, software applications may be stored in the internal memory 302 before they are accessed and loaded into the processor 301. For example, the internal memory 302 may include transaction application 324 and device-specific application 328. Applications 324 and 328 may be used to perform various functions assigned to purchaser mobile device 202 and merchant mobile device 222 as described above. In an embodiment, the processor 301 may include, or have access to, an internal memory 302 sufficient to store the application software instructions. The memory may also include an operating system 322.

The internal memory of the processor may include a secure memory (not illustrated) which is not directly accessible by users or applications and that is capable of recording Mobile Device Identification Numbers (MDINs) and Single In-line Memory Module (SIMM) IDs as described in the various embodiments. As part of the processor, such a secure memory may not be replaced or accessed without damaging or replacing the processor.

Additionally, the internal memory 302 may be a volatile or nonvolatile memory, such as flash memory, or a mixture of both. For the purposes of this description, a general reference to memory refers to all memory accessible by the processor 301, including internal memory 302, removable memory plugged into the computing device, and memory within the processor 301 itself, including the secure memory.

In an embodiment, additional memory chips (e.g., a Secure Data (SD) card) may be plugged into the mobile device 300 and coupled to the processor 301.

Figure 9:
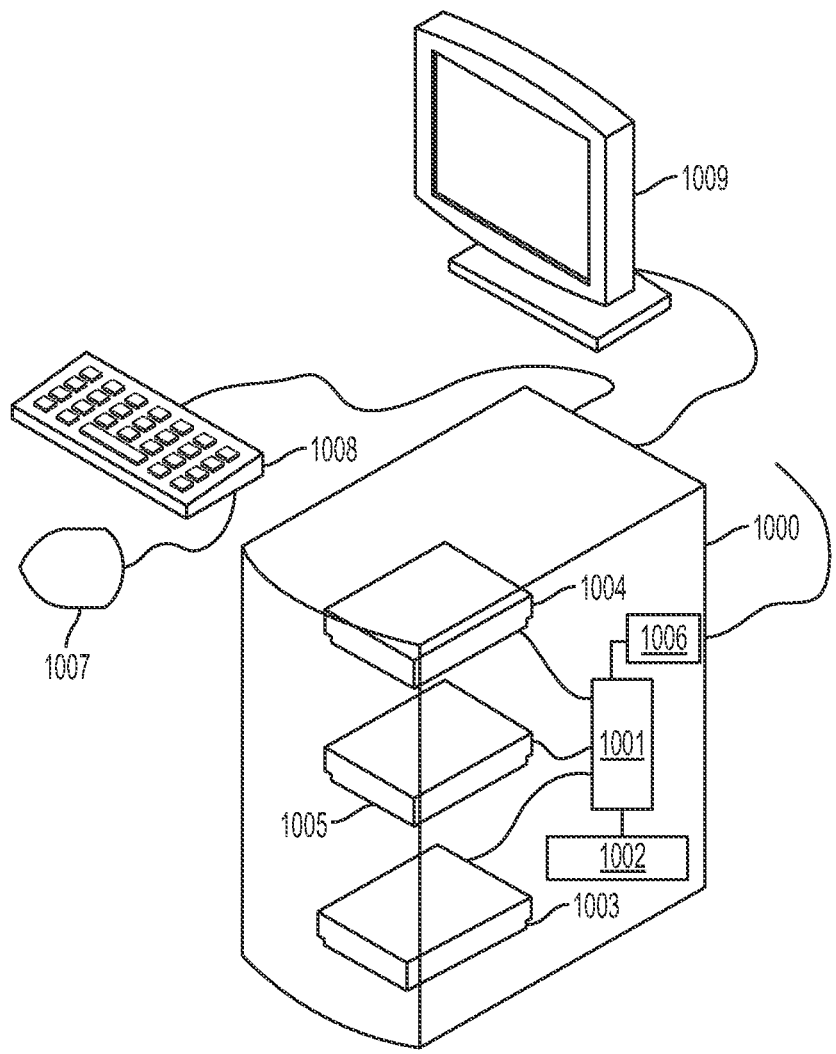
FIG. 9 is a block diagram of a computing device suitable for use with any of the embodiments.

FIG. 9 is a block diagram of a computing device suitable for use with any of the embodiments. As previously described, the subscriber may interact with the various servers and network components using a variety of the computing devices, including a personal computer. By way of illustration, the functional components of a computing device 1000 are illustrated in FIG. 9.

Such a computing device 1000 typically includes a processor 1001 coupled to volatile memory 1002 and a large capacity nonvolatile memory, such as a disk drive 1003. Typically, software applications, such as an email client, may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008, and a display 1009. The computing device 1000 may also include a number of connector ports 1006 coupled to the processor 1001 for establishing data connections or network connections or for receiving external memory devices, such as a USB or FireWire® connector sockets. In a notebook configuration, the computer housing includes the pointing device 1007, keyboard 1008, and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant.

Figure 10:
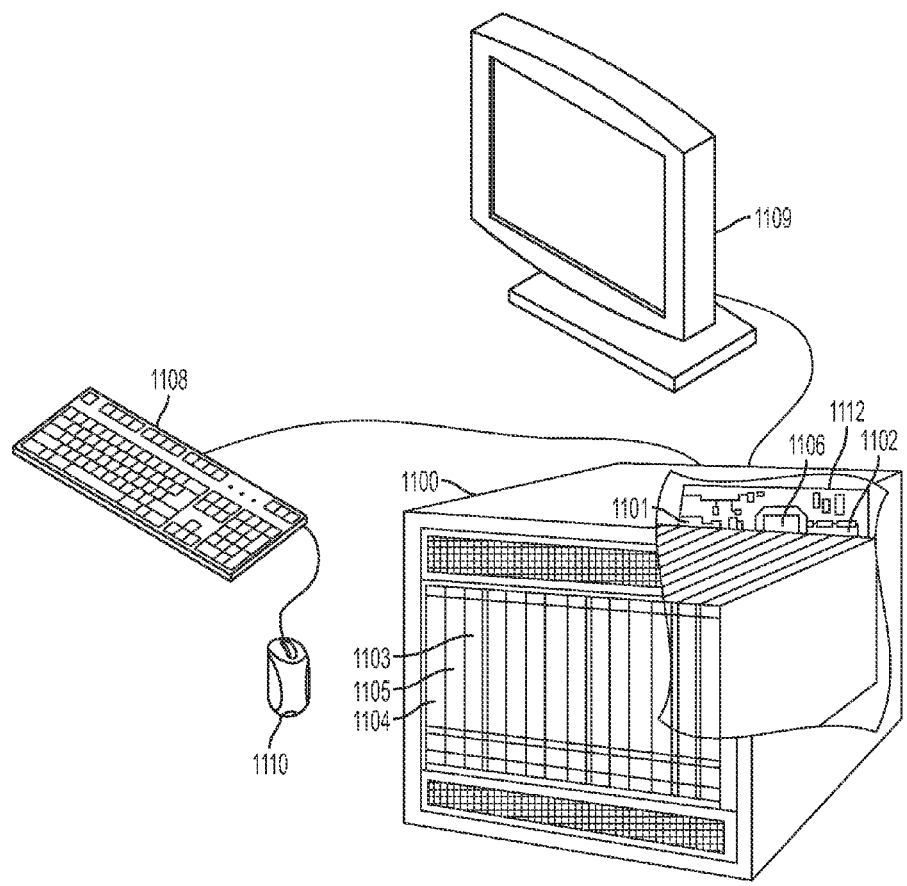
FIG. 10 is a perspective view of a computing device suitable for use as a server in various aspects.

The various embodiments may also be implemented on any of a variety of commercially available server devices, such as the server 1100 illustrated in FIG. 10.

Such a server 1100 typically includes a processor 1101, for execution of the visibility rules or the performance of the tasks of an email server, coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the visibility rules as illustrated in various embodiments described above.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The aspect methods described herein may be implemented in a computing device by configuring a processor of the computing device with processor-executable instructions to perform the operations of the method. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the operations and functions described herein may be implemented in hardware, software, firmware, or any combination thereof. If implemented in software, the functions may be stored as one or more processor-executable or server-executable instructions or code on a non-transitory computer-readable medium. The operations of a method or algorithm disclosed herein may be embodied in a processor-executable or server-executable software module which may be stored on a non-transitory computer-readable medium or processor-readable medium. Non-transitory computer-readable and processor-readable media may be any available storage media that may be accessed by a computer or processor. By way of example, and not limitation, such non-transitory computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A satellite communication system, comprising:
    a plurality of first antennas each at a fixed non-mobile location, and each configured to communicate with a non-geostationary satellite traveling along an orbital path,
        the plurality of first antennas each configured to transmit a communication signal upwardly, the communication signal forming an orbital intercept area along the orbital path,
        the non-geostationary satellite being adapted to receive the communication signal when traversing the orbital intercept area,
        the plurality of first antennas forming a series of partially overlapping orbital intercept areas,
        the series of partially overlapping orbital intercept areas covering a continuous extent of a substantial portion of the orbital path;
    a plurality of communication stations, each of the plurality of first antennas being secured to respective ones of the plurality of communication stations, the plurality of communication stations operatively connected to a communication network; and
    a user device having processing capability and adapted to store a satellite tasking application, the user device adapted to communicate with the non-geostationary satellite using the satellite tasking application and the communication network, wherein the satellite tasking application is adapted to prompt a user of the user device with one or more menus configured to assist the user in developing a task to be communicated to the non-geostationary satellite.

2. The satellite communication system of claim 1, wherein the plurality of communication stations are adapted to receive satellite data transmitted from the non-geostationary satellite.

3. The satellite communication system of claim 1, wherein at least one of the plurality of communication stations is at least one of a building, tower and special purpose structure.

4. The satellite communication system of claim 1, further comprising:
    a plurality of second antennas each secured to respective ones of the plurality of communication stations, the plurality of second antennas each configured to communicate with at least one other of the plurality of communication stations.

5. The satellite communication system of claim 4, wherein the second antenna is a cellular antenna.

6. The satellite communication system of claim 1, wherein a beam width of the signal is defined by a diameter of the orbital intercept area through which the non-geostationary satellite is configured to pass, the beam width being narrower than a satellite antenna beam width configured to surround an individual one of the first antennas.

7. The satellite communication system of claim 6, wherein the diameter of the beam width is substantially the same for the plurality of first antennas.

8. The satellite communication system of claim 1, wherein the signal is directed toward a region of the sky substantially above a visible horizon.

9. The satellite communication system of claim 1, wherein input provided by a user of the user device running the satellite tasking application is communicated to the non-geostationary satellite.

10. The satellite communication system of claim 1, wherein the user device is adapted to receive satellite data, reformat the satellite data into a format chosen by the user and display the reformatted satellite data on the user device.

11. The satellite communication system of claim 1, wherein the user device is a mobile device using wireless communications.

12. The satellite communication system of claim 1, further comprising:
    a satellite tasking server being operatively connected to the communication network, the satellite tasking server storing a first set of tasking commands used in tasking the non-geostationary satellite, the satellite tasking server adapted to be accessed by the user device by way of the communication network for communicating with the non-geostationary satellite using the first set of tasking commands.

13. The satellite communication system of claim 12, wherein the satellite tasking server maintains at least one second set of tasking commands uniquely suited for tasking another non-geostationary satellite.

14. A satellite communication system, comprising:
    a plurality of first antennas each at a fixed non-mobile location, and each configured to communicate with a non-geostationary satellite traveling along an orbital path, the plurality of first antennas each configured to transmit a communication signal upwardly, the communication signal forming an orbital intercept area along the orbital path, the non-geostationary satellite being adapted to receive the communication signal when traversing the orbital intercept area, the plurality of first antennas forming a series of partially overlapping orbital intercept areas, the series of partially overlapping orbital intercept areas covering a continuous extent of a substantial portion of the orbital path;

a plurality of communication stations, each of the plurality of first antennas being secured to respective ones of the plurality of communication stations, the plurality of communication stations operatively connected to a communication network; and a user device having processing capability and adapted to store a satellite tasking application, the user device adapted to communicate with the non-geostationary satellite using the satellite tasking application and the communication network, wherein the satellite tasking server maintains a list of satellites, the non-geostationary satellite being selected by a processor based at least in-part on an ability of the non-geostationary satellite to obtain requested data.

15. A satellite communication system comprising:

a plurality of communication stations forming at least part of a communication network, each of the plurality of communication stations including a first and second antennas, the first antennas of the plurality of communication stations together forming a plurality of first antennas, the first antennas each at a fixed non-mobile location and configured to transmit a communication signal upwardly, the communication signal forming an orbital intercept area along the orbital path, the non-geostationary satellite being adapted to receive the communication signal when traversing the orbital intercept area, the plurality of first antennas forming a series of partially overlapping orbital intercept areas, the series of partially overlapping orbital intercept areas covering a continuous extent of a substantial portion of the orbital path, each of the second antennas configured to communicate with at least one other of the plurality of communication stations; and a user device having a processor and a data store operatively connected thereto, the data store storing a satellite tasking application, the satellite tasking application when executed by the processor communicates instructions from the user device to the non-geostationary satellite using the communication network, wherein the satellite tasking application is adapted to prompt a user of the user device with one or more menus configured to assist the user in developing a task to be communicated to the non-geostationary satellite.

16. The satellite communication system of claim 15, further comprising:

a satellite tasking server operatively connected to the communication network, the satellite tasking server storing tasking commands for tasking the non-geostationary satellite, the satellite tasking server adapted to be accessed by the user device by way of the communication network for communicating with the non-geostationary satellite using the tasking commands.

17. The satellite communication system of claim 15, wherein the user device is adapted to reformat data received from the non-geostationary satellite into a format selected by the user.

18. The satellite communication system of claim 15, wherein the plurality of communication stations are adapted to receive satellite data transmitted from the non-geostationary satellite.

19. The satellite communication system of claim 15, wherein at least one of the plurality of communication stations is at least one of a building, tower and special purpose structure.

20. The satellite communication system of claim 15, wherein at least one of the second antennas is a cellular antenna.

21. The satellite communication system of claim 15, wherein each of the first antennas transmits a signal upwardly, a beam width of the signal is defined by a diameter of the orbital intercept area through which the non-geostationary satellite is configured to pass, the beam width being narrower than a satellite antenna beam width configured to surround an individual one of the first antennas.

22. The satellite communication system of claim 21, wherein the diameter of the beam width is substantially the same for the plurality of first antennas.

23. The satellite communication system of claim 21, wherein the signal is directed toward a region of the sky substantially above a visible horizon.

24. The satellite communication system of claim 15, wherein input provided by a user of the user device running the satellite tasking application is communicated to the non-geostationary satellite.

25. The satellite communication system of claim 15, wherein the user device includes a processor and data store operatively connected thereto, the data store storing instructions that when executed by the processor cause the user device to receive satellite data, reformat the satellite data into a format chosen by the user and display the reformatted satellite data on the user device.

26. The satellite communication system of claim 15, wherein the user device is a mobile device using wireless communications.

27. The satellite communication system of claim 16, further comprising:

a satellite tasking server being operatively connected to the communication network, the satellite tasking server storing a first set of tasking commands used in tasking the non-geostationary satellite, the satellite tasking server adapted to be accessed by the user device by way of the communication network for communicating with the non-geostationary satellite using the first set of tasking commands.

28. The satellite communication system of claim 27, wherein the satellite tasking server maintains at least one second set of tasking commands uniquely suited for tasking another non-geostationary satellite.

29. A satellite communication system comprising:

a plurality of communication stations forming at least part of a communication network, each of the plurality of communication stations including a first and second antennas, the first antennas of the plurality of communication stations together forming a plurality of first antennas, the first antennas each at a fixed non-mobile location and configured to transmit a communication signal upwardly, the communication signal forming an orbital intercept area along the orbital path, the non-geostationary satellite being adapted to receive the communication signal when traversing the orbital intercept area, the plurality of first antennas forming a series of partially overlapping orbital intercept areas, the series of partially overlapping orbital intercept areas covering a continuous extent of a substantial portion of the orbital path, each of the second antennas configured to communicate with at least one other of the plurality of communication stations;

a user device having a processor and a data store operatively connected thereto, the data store storing a satellite tasking application, the satellite tasking application when executed by the processor communicates instructions from the user device to the non-geostationary satellite using the communication network; and a satellite tasking server operatively connected to the communication network, the satellite tasking server storing a first set of tasking commands for tasking the non-geostationary satellite, the satellite tasking server adapted to be accessed by the user device by way of the communication network for communicating with the non-geostationary satellite using the first set of tasking commands, wherein the satellite tasking server maintains a list of satellites, the non-geostationary satellite being selected by a processor based at least in-part on an ability of the non-geostationary satellite to obtain requested data.

* * * * *